(12) United States Patent
Fergen et al.

(10) Patent No.: US 8,901,942 B2
(45) Date of Patent: Dec. 2, 2014

(54) SYSTEM FOR LOCATING AND IDENTIFYING AT LEAST TWO SEPARATE ITEMS

(75) Inventors: Immanuel Fergen, Karlsruhe (DE); Martin Schmitt-Lewen, Heidelberg (DE); Christian Wagner, Kronau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 131 days.

(21) Appl. No.: 13/469,727

(22) Filed: May 11, 2012

(65) Prior Publication Data
US 2012/0286808 A1 Nov. 15, 2012

(30) Foreign Application Priority Data

May 11, 2011 (DE) .................. 10 2011 101 237

(51) Int. Cl.
  *G01R 27/26* (2006.01)
  *G06F 3/044* (2006.01)
  *G06K 7/08* (2006.01)
(52) U.S. Cl.
  CPC ............... *G06F 3/044* (2013.01); *G06K 7/081* (2013.01)
  USPC ............................ 324/658; 324/660; 324/690
(58) Field of Classification Search
  CPC ................................. G06K 7/081; G06F 3/044
  USPC ................................................. 324/658–690
  See application file for complete search history.

(56) References Cited

U.S. PATENT DOCUMENTS

| | | |
|---|---|---|
| 4,634,847 A | 1/1987 | Juergen |
| 4,673,932 A | 6/1987 | Ekchian et al. |
| 5,671,362 A | 9/1997 | Cowe et al. |
| 6,202,929 B1 | 3/2001 | Verschuur et al. |
| 7,103,976 B2 | 9/2006 | Pennella et al. |
| 7,233,241 B2 | 6/2007 | Overhultz et al. |

(Continued)

FOREIGN PATENT DOCUMENTS

| | | |
|---|---|---|
| AT | 504 406 A1 | 5/2008 |
| AT | 504 959 A2 | 9/2008 |

(Continued)

OTHER PUBLICATIONS

German Patent and Trademark Office Search Report, Dated Mar. 5, 2012.

*Primary Examiner* — Jermele M Hollington
*Assistant Examiner* — Farhana Hoque
(74) *Attorney, Agent, or Firm* — Laurence A. Greenberg; Werner H. Stemer; Ralph E. Locher

(57) ABSTRACT

A system for locating and identifying at least two separate items, for example packaging, includes a capacitive first sensor detecting a first measuring region at a first position of a sensor device, for example a sensor film on a shelf bottom for packaging, a capacitive second sensor detecting a second measuring region at a second position, differing from the first position, of the sensor device, an electrically conductive first mark of a first item in the measuring region of one sensor, an electrically conductive second mark of a second item in the measuring region of the other sensor, and an evaluation device evaluating signals from the sensors, the signals caused or changed by electrical conductivity of the marks. Items can be capacitively detected and information obtained can be used to improve warehousing. The sensors and the marks can be produced quickly and cost-effectively by printing processes or film transfer.

6 Claims, 7 Drawing Sheets

(56) References Cited

U.S. PATENT DOCUMENTS

| | | | |
|---|---|---|---|
| 7,510,123 | B2 | 3/2009 | Overhultz et al. |
| 7,535,337 | B2 | 5/2009 | Overhultz et al. |
| 7,621,441 | B1 | 11/2009 | Milford et al. |
| 7,815,439 | B2 | 10/2010 | Klein et al. |
| 2006/0164247 | A1 | 7/2006 | Overhultz et al. |
| 2006/0178024 | A1 | 8/2006 | Overhultz et al. |
| 2007/0035380 | A1* | 2/2007 | Overhultz et al. ............ 340/5.9 |
| 2007/0071131 | A1 | 3/2007 | Pyne et al. |
| 2007/0108986 | A1 | 5/2007 | Moore et al. |
| 2009/0045823 | A1 | 2/2009 | Tasher et al. |
| 2010/0036754 | A1* | 2/2010 | Khan et al. .................... 705/28 |
| 2011/0155806 | A1 | 6/2011 | Franz et al. |
| 2011/0253789 | A1 | 10/2011 | Thiele et al. |
| 2012/0125993 | A1 | 5/2012 | Thiele et al. |

FOREIGN PATENT DOCUMENTS

| | | | |
|---|---|---|---|
| CH | 695 250 | A5 | 2/2006 |
| DE | 34 47 599 | A1 | 9/1985 |
| DE | 34 12 687 | A1 | 10/1985 |
| DE | 41 34 225 | A1 | 4/1993 |
| DE | 100 11 281 | A2 | 10/2000 |
| DE | 199 17 223 | A1 | 10/2000 |
| DE | 20 2007 013 361 | U1 | 12/2007 |
| DE | 10 2007 029 384 | A1 | 1/2009 |
| DE | 20 2008 016 187 | U1 | 3/2009 |
| DE | 20 2008 015 342 | U1 | 5/2009 |
| EP | 0158079 | A2 | 10/1985 |
| WO | 96/31833 | A1 | 10/1996 |
| WO | 2005122068 | A1 | 12/2005 |
| WO | 2006/055667 | A2 | 5/2006 |
| WO | 2009/023888 | A2 | 2/2009 |
| WO | 2010043422 | A1 | 4/2010 |

\* cited by examiner

SYSTEM FOR LOCATING AND IDENTIFYING AT LEAST TWO SEPARATE ITEMS

CROSS-REFERENCE TO RELATED APPLICATION

This application claims the priority, under 35 U.S.C. §119, of German Patent Application DE 10 2011 101 237.4, filed May 11, 2011; the prior application is herewith incorporated by reference in its entirety.

BACKGROUND OF THE INVENTION

Field of the Invention

The present invention relates to a system for locating and identifying at least two separate items.

The prior art has already disclosed two-dimensional sensor configurations which are based on capacitive sensors and are used to determine the position of an item, for example a finger on a touch-sensitive monitor.

U.S. Patent Application Publication No. US 2009/0045823 A1 has already disclosed a so-called printed circuit board (PCB) which can be used as a capacitive sensor array for input devices, for example so-called touch screens. The system uses the electrical conductivity of human skin, that is to say there is no need for any special provisions in order to be able to use fingers for input. The fingers are not identified.

International Publication No. WO 2009/023888 A2 discloses a pressure-sensitive coordinate device, in which a measurable and detectable change in the capacitance of electrodes of an electrode configuration are produced by the position and intensity of an action of force on a polymer foam of the device. A similar apparatus is disclosed in Austrian Patent AT 504 406 B1 or Austrian Patent AT 504 959 B1. The system requires a pressure to be exerted and deformation in order to achieve measurement results.

In warehousing, it is also known practice to provide sensors on or at shelves.

German Patent DE 34 12 687 C2 discloses, for example, capacitive sensors which are read through printed conductor tracks and are activated by tapping with the finger. Information relating to the goods is transmitted to the user as a result of the tapping.

International Publication No. WO 96/31833 A1 discloses a shelf bottom having pressure-sensitive capacitive sensors, in which the shelf bottom allows the presence and quantity of items to be determined. Provision is not made for the items to be identified.

International Publication No. WO 2006/055667A2, corresponding to U.S. Pat. Nos. 7,233,241; 7,510,123 and 7,535, 337 as well as U.S. Patent Application Publication Nos. US 2006/017802; US 2007/071131 and 2007/108986, discloses a system which makes it possible to determine the presence or absence of an item on a shelf. In that case, the pressure of the item on its support is measured by using a sensor and the result is transmitted, using a so-called RFID tag, from the sensor to a remote location which processes the result further. Provision is not made for the items to be identified.

Capacitively operating cards and card readers are also known. A printed card having electrically conductive areas is pushed into the card reader in each case and the latter identifies the identity of the card through the use of the distribution of the areas on the card. Provision is not made for the position of the card to be measured. In addition, provision is not made for a plurality of cards to be processed at the same time. That technology is described in the following documents: German Utility Model DE 20 2008 015 342 U1 and German Utility Model DE 20 2008 016 187 U1, both corresponding to U.S. Patent Application Publication No. US 2011/0253789, German Patent Application DE 10 2007 029 384 A1, corresponding to U.S. Patent Application Publication No. US 2011/0155806 and German Utility Model DE 20 2007 013 361 U1.

SUMMARY OF THE INVENTION

It is accordingly an object of the invention to provide a system for locating and identifying at least two separate items, which overcomes the hereinafore-mentioned disadvantages and is improved in comparison with the heretofore-known systems of this general type, which allows both the position and the identity of more than one item to be determined, which manages without complicated, cost-intensive, pressure-sensitive sensors or RFID tags and which, in particular, has components which are printed or produced by film transfer and can be considered to be so-called "disposable items."

With the foregoing and other objects in view there is provided, in accordance with the invention, a system for locating and identifying at least two separate items. The system comprises a sensor device having a first position with a first measuring region and a second position with a second measuring region, in which the second position differs from the first position. At least one capacitive first sensor is configured to detect the first measuring region at the first position of the sensor device, at least one capacitive second sensor is configured to detect the second measuring region at the second position of the sensor device, at least one electrically conductive first mark of a first item is disposed in the measuring region of one of the sensors and at least one electrically conductive second mark of a second item is disposed in the measuring region of another of the sensors. An evaluation device is configured to evaluate signals from the sensors, the signals being caused or changed by electrical conductivity of the marks of the items.

The system according to the invention advantageously allows the position and the identity of more than one item to be determined without complicated, cost-intensive, pressure-sensitive sensors or RFID tags. Cost-effective capacitive sensors, that is to say sensors which detect capacitance changes, which are simple to produce, are used instead according to the invention. As described in detail further below, such sensors and sensor arrays based on the latter, as well as the marks required for the system, can be produced quickly and inexpensively using printing methods or film transfer methods. It is thus possible to produce both necessary components of the system (sensors and marks) using the same production method and preferably at the same production location and using the same production machines. If the items are packaging items, for example, a sensor device which is matched to the packaging items and is produced by using the same machines and the same materials can be attached to the packaging items in their outer packaging.

In accordance with another preferred feature of the invention, the first sensor and the second sensor are in the form of electrically conductive areas. One development of the system according to the invention which is likewise preferred can be distinguished by the fact that the first mark and the second mark are in the form of electrically conductive areas.

One development of the system according to the invention which is advantageous for detecting freely positionable items and is therefore preferred can be distinguished by the fact that the sensor device includes a two-dimensional configuration of sensors. The configuration may include n times m sensors, where n and m are integers greater than or equal to 2.

One development of the system according to the invention which is advantageous in terms of cost-effective production and is therefore preferred can be distinguished by the fact that the marks include printable, electrically conductive material. One development of the system according to the invention which is likewise advantageous in terms of cost-effective production and is therefore preferred can be distinguished by the fact that the sensor device has an electrically non-conductive film, and by the fact that the areas are printed onto the film or are produced through the use of film transfer. One development of the system according to the invention which is also advantageous in terms of cost-effective production and is therefore preferred can be distinguished by the fact that the areas include printable, electrically conductive material.

One development of the system according to the invention which is advantageous for use in warehousing and is therefore preferred can be distinguished by the fact that the items have substantially flat bottoms made of cardboard or paperboard, and by the fact that the marks are printed onto the bottoms or are produced through the use of film transfer. One development of the system according to the invention which is likewise advantageous for use in warehousing and is therefore preferred can be distinguished by the fact that the system has a shelf for the items, having at least two bottoms disposed above one another, each bottom being provided with a respective sensor device. A further development of the system according to the invention which is advantageous for use in warehousing and is therefore preferred can be distinguished by the fact that the system has a multiplicity of such shelves, and by the fact that the evaluation device locates and identifies items on at least two bottoms of different shelves at substantially the same time.

The described invention and the described advantageous developments of the invention are also advantageous developments of the invention in combination with one another.

The following method is also proposed according to the invention: printing a first product with an electrically conductive first structure and printing a second product with an electrically conductive second structure which is matched to the first structure, the two structures being constructed, in terms of their spatial and capacitive nature, in such a manner that a characteristic signal is produced when the two products are disposed in the vicinity of one another.

Furthermore, the following method is also proposed according to the invention: a detection method in which a first printed product with an electrically conductive first structure and a second printed product with an electrically conductive second printed structure matched to the first structure are brought into the vicinity of one another, with the position of the two structures relative to one another causing a characteristic detection signal.

With regard to the two methods mentioned above, the term "vicinity" includes, in particular, a distance between the products in the region of the so-called near field, preferably of less than approximately 1 centimeter, preferably of less than approximately 1 millimeter and particularly preferably direct contact. The term "characteristic (detection) signal" includes a signal which allows at least one of the two products to be identified.

The invention as such as well as structurally and/or functionally advantageous developments of the invention are described in more detail below with reference to the associated drawings using at least one preferred exemplary embodiment. In the drawings, mutually corresponding elements are each provided with the same reference symbols.

Other features which are considered as characteristic for the invention are set forth in the appended claims.

Although the invention is illustrated and described herein as embodied in a system for locating and identifying at least two separate items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
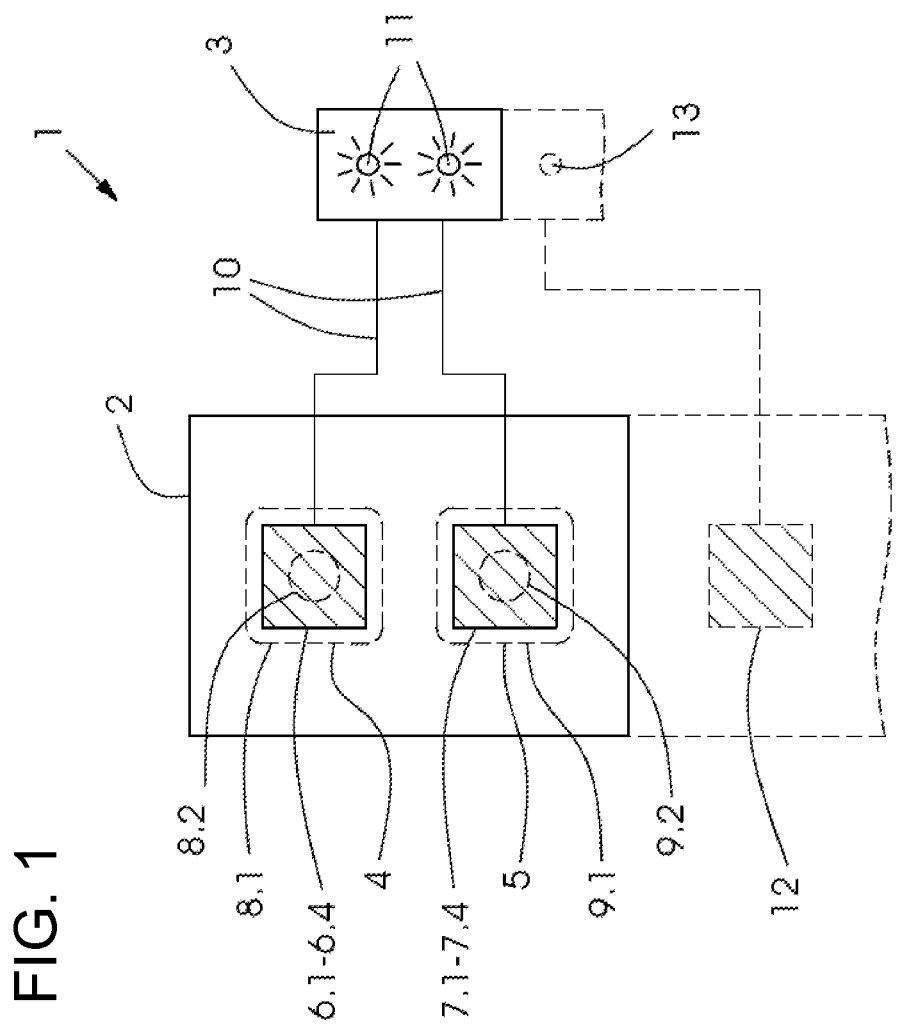
FIG. 1 is a fragmentary, diagrammatic, plan view of one preferred exemplary embodiment of a system according to the invention.

Referring now to the figures of the drawings in detail and first, particularly, to FIG. 1 thereof, there is seen a system 1 according to the invention having a sensor device 2, an evaluation device 3 and two items 4 and 5 (or 8.1 and 9.1) to be determined.

A capacitive first sensor 6.2 is situated at a first position 6.1 of the sensor device. The first sensor includes an electrically conductive first area 6.3. The first sensor detects a first measuring region 6.4, with the first measuring region being able to be substantially identical to the first area or else being able to be larger. A capacitive second sensor 7.2 is situated at a second position 7.1 of the sensor device. The second sensor includes an electrically conductive second area 7.3. The second sensor detects a second measuring region 7.4, with the second measuring region being able to be substantially identical to the second area or else being able to be larger. The electrically conductive sensors may be formed on an electrically non-conductive or dielectric film or paper or cardboard. The electrically conductive sensors and their areas may include printable, electrically conductive material. In other words: the sensors may be printed using electrically conductive printing inks (for example inks containing PEDOT, polymers, graphite, carbon nanotubes, graphene, silver or metal pigment). Alternatively, the sensors may also be produced through the use of film transfer, for example using a cold film transfer material. Other preferred production methods are: film lamination, hot stamping, thermal transfer, vacuum deposition, electroplating processes or coating processes (each preferably with simultaneous or subsequent structuring). The areas may be disposed in or on the film. Additional protective layers (electrical insulation, a layer which repels dirt/moisture, a layer which prevents oxidation) or layers for hiding the marks may also be provided.

A first item 8.1 includes an electrically conductive first mark 8.2. The first mark is disposed in the first measuring region 6.4 or the first item 8.1 is placed on the sensor device 2 in such a manner that the first mark is detected by the first measuring region. A second item 9.1 includes an electrically conductive second mark 9.2. The second mark is disposed in the second measuring region or the second item 9.1 is placed on the sensor device 2 in such a manner that the second mark is detected by the second measuring region. The items and their marks may include printable, electrically conductive material. In other words: the marks can be printed using electrically conductive printing inks (for example inks containing PEDOT, polymers, graphite, carbon nanotubes, graphene, silver or metal pigment). Alternatively, the marks may also be produced through the use of film transfer, for example using a cold film transfer material. Other preferred production methods are: film lamination, hot stamping, thermal transfer, vacuum deposition, electroplating processes or coating processes (each preferably with simultaneous or subsequent structuring). The marks may be disposed in or on the item. The item itself or a section of the item, to which the mark is applied, is preferably not electrically conductive or is dielectric (preferably film, paper or cardboard). The section may, for example, be a dielectric coating of the item. The marks may be matched to the areas of the sensors, in particular with regard to size, spacing and number, or vice versa.

The evaluation device 3 for evaluating signals from the sensors 6.2 and 7.2 is connected to the sensors through (possibly electrically shielded) signal lines 10 and has evaluation electronics. Alternatively, radio links are also possible. The evaluation device preferably includes a signal generator, an operational amplifier and a microprocessor. The signal lines may be coupled to the evaluation device through plug-in connections. The signals produced by the signal generator are changed by the electrical conductivity of the marks 8.2 and 9.2 of the items. The presence of the first mark 8.2 in the first measuring region 6.4 has a measurable influence on the electrical capacitance of the first sensor 6.2. The clocking of the reading process, that is to say the production of clocked voltage signals, for the signal can be matched to the marks. The evaluation device therefore registers the presence of the first item. A corresponding situation applies to the presence of the second item. The effects of the marks are substantially identical, that is to say they cause substantially identical signals. The result of the evaluation is that: a marked item is situated substantially at the first position 6.1 and a marked item is situated substantially at the second position 7.1. The result is indicated, for example, by two active luminous elements 11. In this way, the items are situated and are simultaneously identified through their respective mark, that is to say an unmarked item would not be situated and identified.

FIG. 1 also shows that the sensor device 2 may include further sensors 12 which are likewise connected to the evaluation device 3. Items which are not present are indicated by inactive further luminous elements 13.

Figure 2:
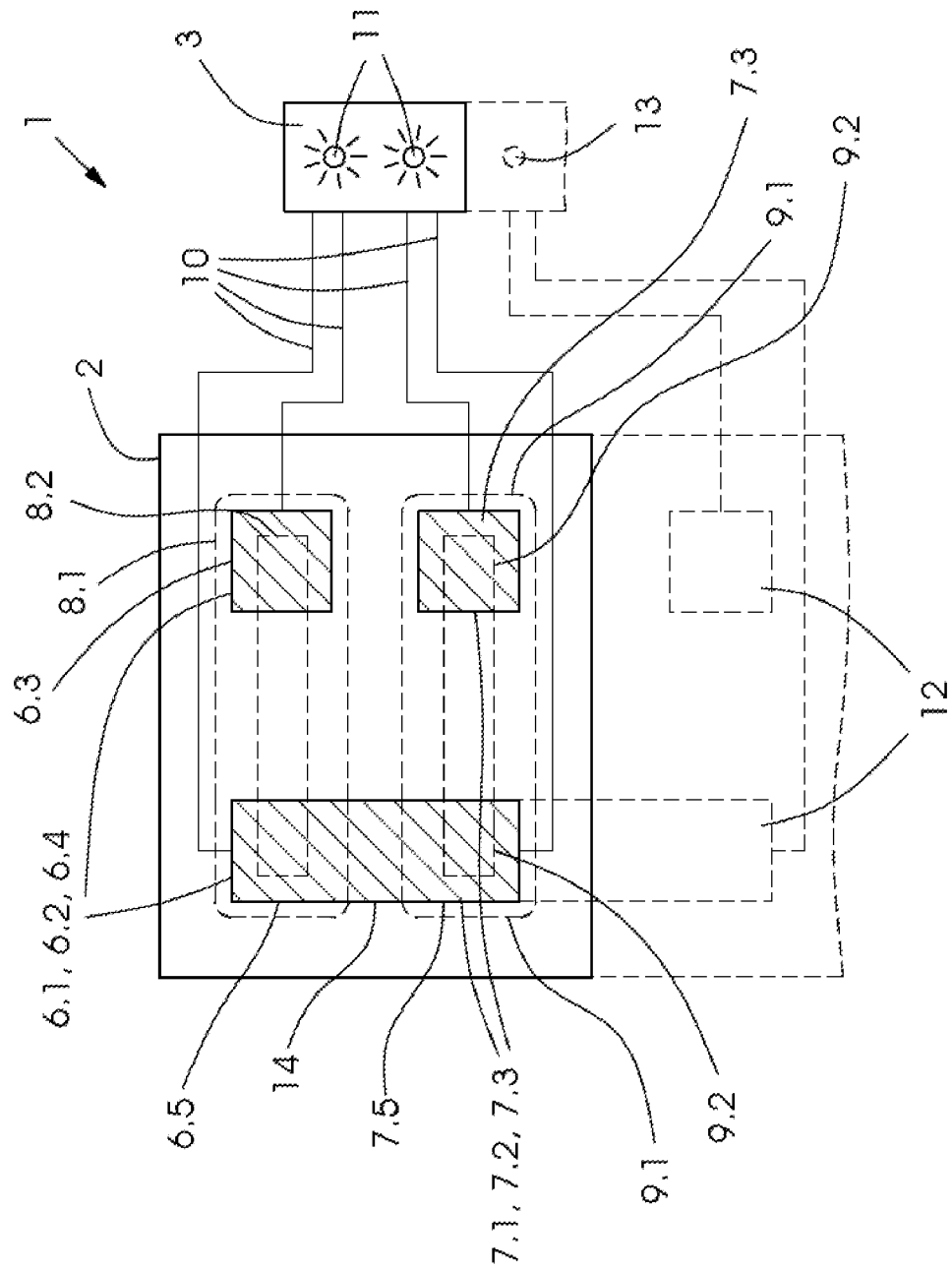
FIG. 2 is a fragmentary, plan view of another preferred exemplary embodiment of a system according to the invention.

FIG. 2 shows a further system according to the invention.

A two-part capacitive first sensor 6.2 having a transmitting area and a receiving area is situated at a first position 6.1 of the sensor device 2. The first sensor includes an electrically conductive first area 6.3 and a first section 6.5 of an electrically conductive third area 14. The first sensor detects a first measuring region 6.4. A two-part capacitive second sensor 7.2 having a transmitting area and a receiving area is situated at a second position 7.1 of the sensor device 2. The second sensor includes an electrically conductive second area 7.3 and a second section 7.5 of the electrically conductive third area 13. The second sensor detects a second measuring region 7.4.

A first item 8.1 includes an electrically conductive first mark 8.2. The first mark is disposed in the first measuring region 6.4 and in this case overlaps the first area 6.3 and the first section 6.5 of the third area 14. A second item 9.1 includes an electrically conductive second mark 9.2. The second mark is disposed in the second measuring region 7.4 and in this case overlaps the second area 7.3 and the second section 7.5 of the third area 14.

The system has an evaluation device 3 which is connected to all of the sensors through respective signal lines 10. The result of the evaluation is that: a marked item is situated substantially at the first position 6.1 and a marked item is situated substantially at the second position 7.1. The result is indicated, for example, by two active luminous elements 11.

FIG. 2 also shows that the sensor device 2 may include further sensors 12 which are likewise connected to the evaluation device 3. Items which are not present are indicated by inactive further luminous elements 13.

Figure 3:
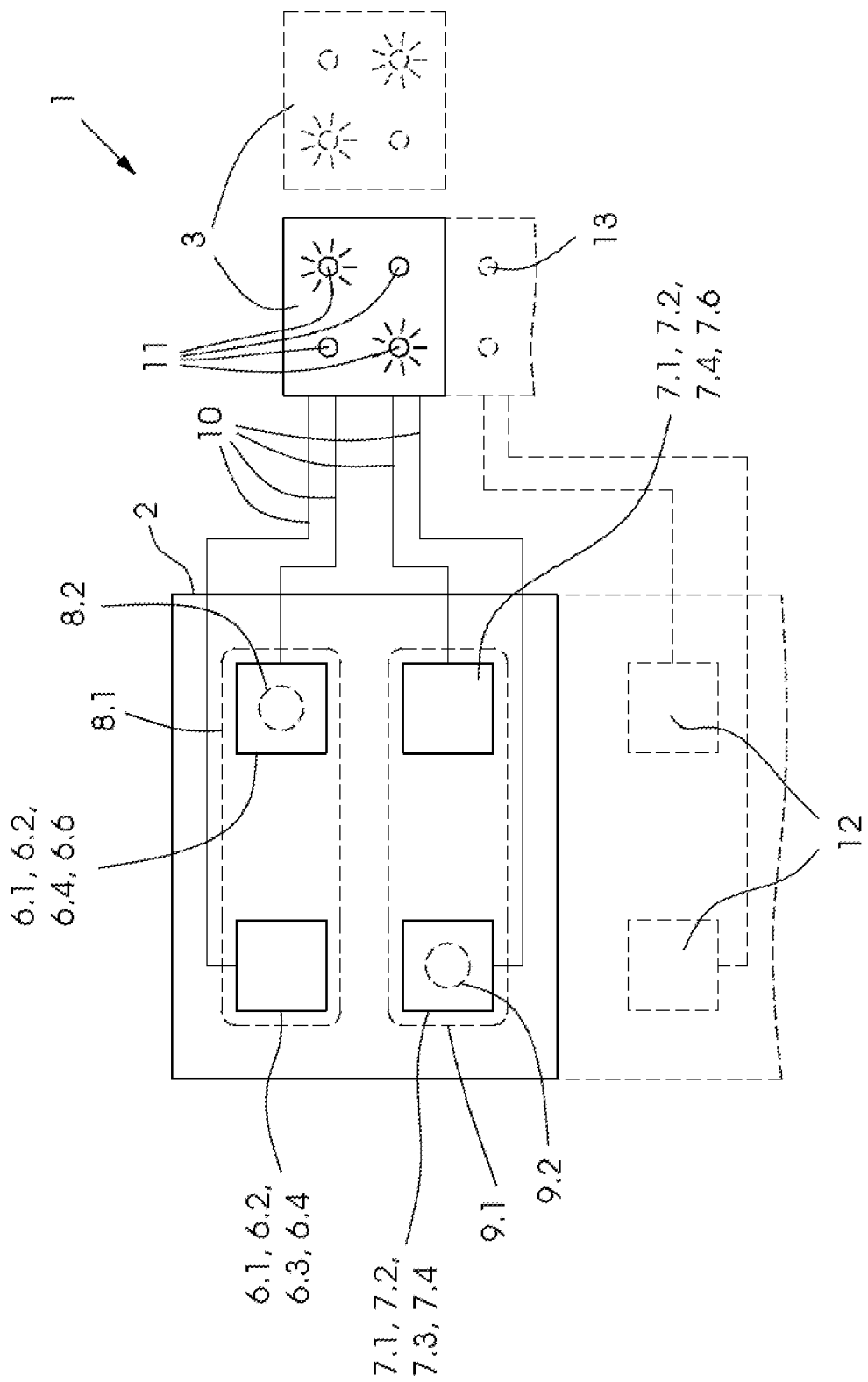
FIG. 3 is a fragmentary, plan view of a further preferred exemplary embodiment of a system according to the invention.

FIG. 3 shows a further system according to the invention.

A two-part capacitive first sensor 6.2 is situated at a first position 6.1 of the sensor device 2. The first sensor includes an electrically conductive first area 6.3 and an electrically conductive third area 6.6 separate therefrom. The first sensor detects a first measuring region 6.4. A two-part capacitive second sensor 7.2 is situated at a second position 7.1 of the sensor device 2. The second sensor includes an electrically conductive second area 7.3 and an electrically conductive fourth area 7.6 separate therefrom. The second sensor detects a second measuring region 7.4.

A first item 8.1 includes an electrically conductive first mark 8.2. The first mark is disposed in the first measuring region 6.4 and overlaps the first area 6.3. A second item 9.1 includes an electrically conductive second mark 9.2. The second mark is disposed in the second measuring region 7.4 and overlaps the fourth area 7.6.

The system has an evaluation device 3 which is connected to all of the sensors through respective signal lines 10. The presence of the first mark 8.2 in the first measuring region 6.4, that is to say the overlap with the first area 6.3, has a measurable influence on the electrical capacitance of the first area. The evaluation device therefore registers the presence of the marked first item 8.1. A corresponding situation applies to the presence of the marked second item 9.1. The first and second items differ by virtue of the fact that the first mark on the first item is provided at a different position from the second mark on the second item. The marks are substantially identical. The items can be identified through the position of the respective mark. The result of the evaluation is that: a marked first item is situated substantially at the first position 6.1 and a marked second item is situated substantially at the second position 7.1. The result is indicated by two luminous elements 11. If the two items were interchanged, the evaluation unit 3 would indicate a result that is illustrated by using dashed lines. Therefore, the rows of the display symbolize the position of the item and the columns symbolize its identity.

FIG. 3 also shows that the sensor device 2 may include further sensors 12 which are likewise connected to the evaluation device 3. Items which are not present are indicated by inactive further luminous elements 13.

Figure 4:
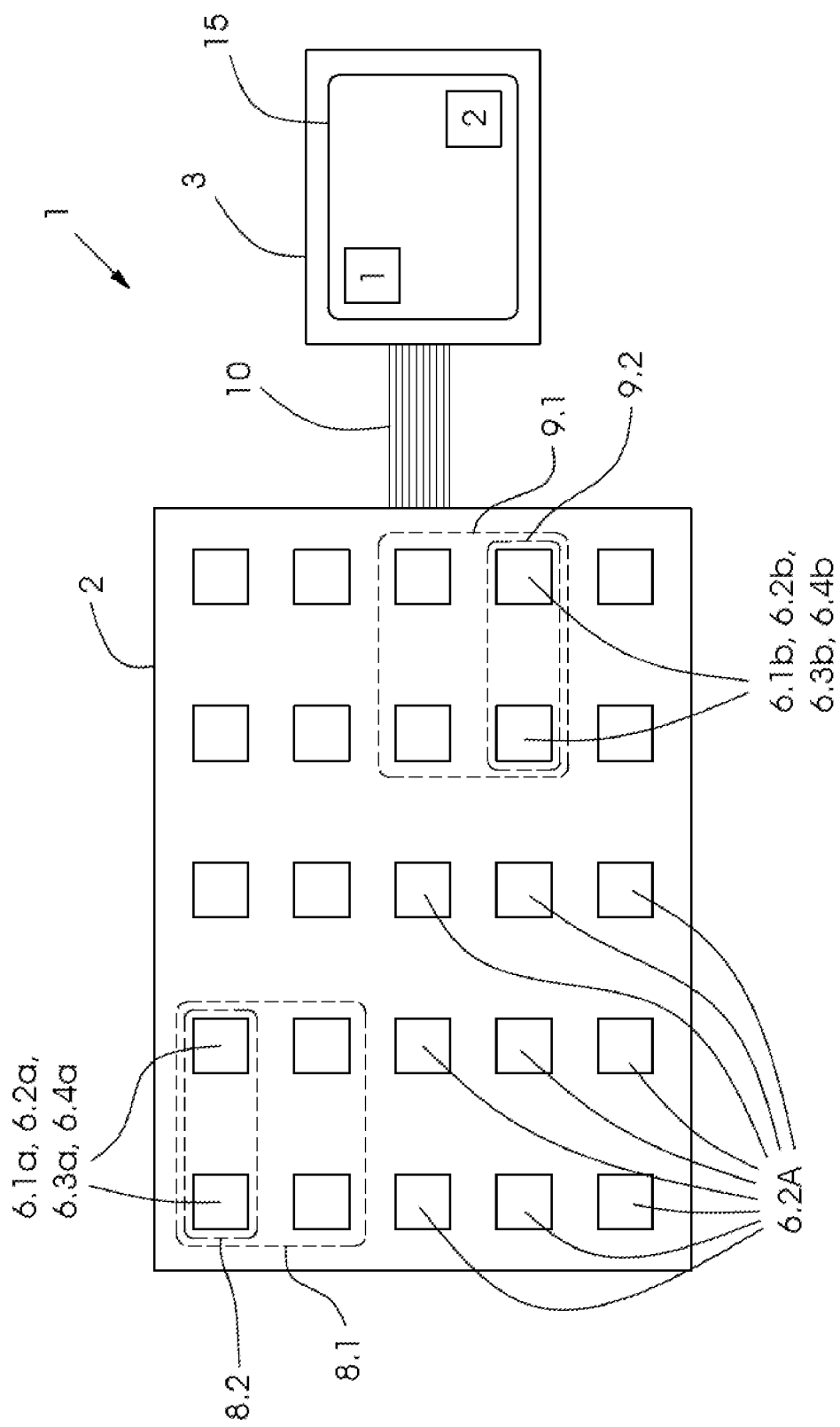
FIG. 4 is a plan view of another preferred exemplary embodiment of a system according to the invention.

FIG. 4 shows a further system according to the invention.

The sensor device 2 includes a multiplicity of capacitive sensors 6.2a, 6.2b, etc. at different positions 6.1a, 6.1b, etc. (or a two-dimensional sensor array 6.2A). Each sensor includes two electrically conductive areas 6.3a, 6.3b, etc. and detects a measuring region 6.4a, 6.4b, etc. assigned to it. A first item 8.1 includes an electrically conductive first mark 8.2. The first mark is disposed in a first measuring region 6.4a. A second item 9.1 includes an electrically conductive second mark 9.2. The second mark is disposed in a second measuring region 6.4b. The second mark differs from the first mark by its position on the item. The items can be placed on the sensor device only in the orientation shown. The items can therefore be identified by the marks. An evaluation device 3 for evaluating signals from the sensors is connected to the sensors through a multiplicity of signal lines 10 corresponding to the number of sensors. The result of the evaluation is that: the first item is situated at the first position and the second item is situated at the second position. The result is graphically indicated on a display 15, for example a monitor, in which case it is possible to see where which item is situated on the sensor device.

The items 8.1 and 9.1 may also be provided with electrically conductive barcodes, with the individual lines (at least one of the respective lines) of the barcodes being used as marks 8.2 and 9.2. The barcodes are then used in two functions: for conventional optical scanning, on one hand, and for capacitive scanning according to the invention, on the other hand.

Figure 5:
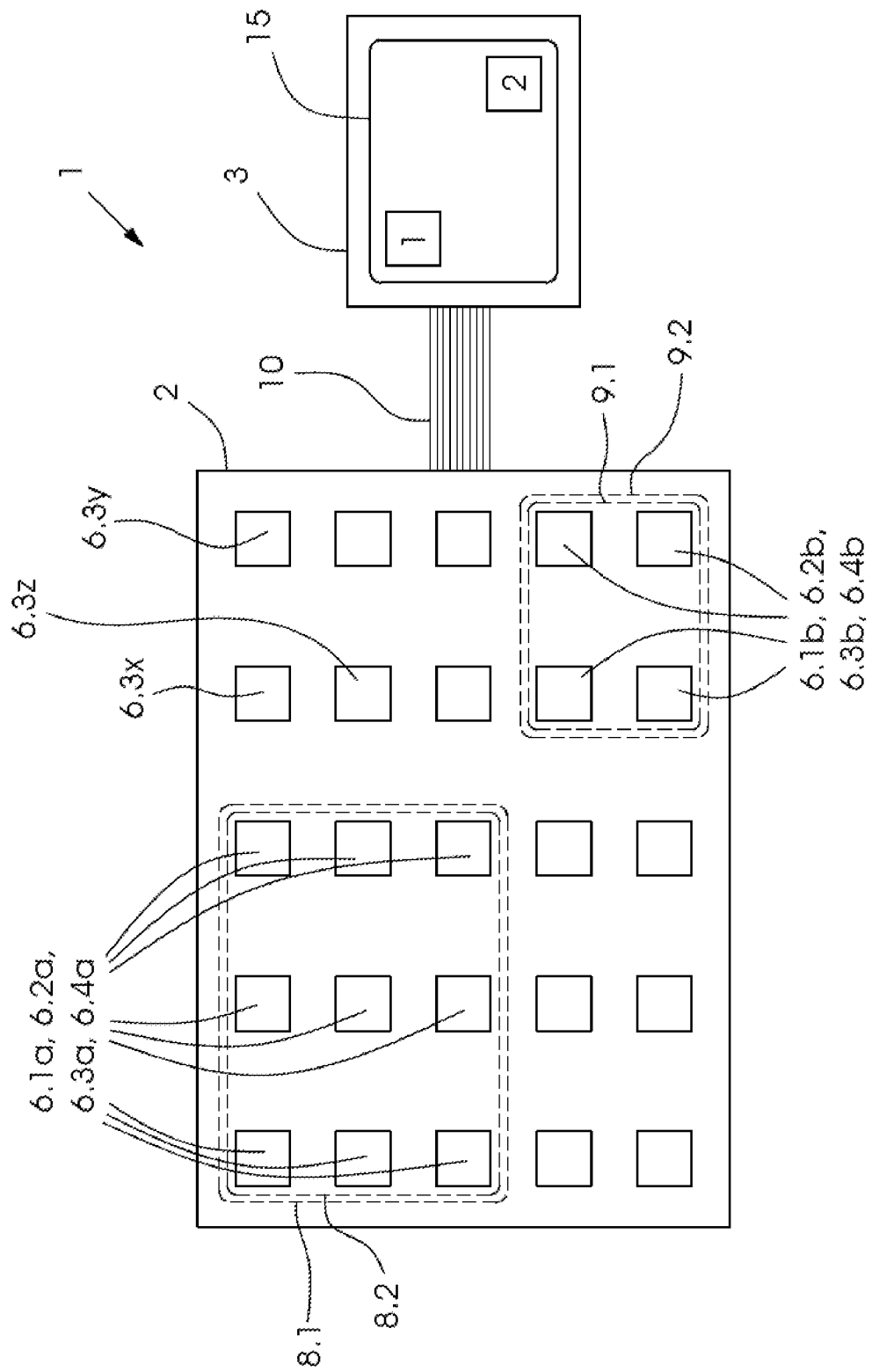
FIG. 5 is a plan view of a further preferred exemplary embodiment of a system according to the invention.

FIG. 5 shows a further system according to the invention.

The sensor device 2 likewise includes a multiplicity of capacitive sensors 6.2a, 6.2b, etc. at different positions 6.1a, 6.1b, etc. (or a two-dimensional sensor array 6.2A). Each sensor includes a plurality of electrically conductive areas 6.3a, 6.3b, etc. and detects a measuring region 6.4a, 6.4b, etc. assigned to it. A first item 8.1 includes an electrically conductive first mark 8.2. The first mark is disposed in a first measuring region 6.4a. A second item 9.1 includes an electrically conductive second mark 9.2. The second mark is disposed in a second measuring region 6.4b. The second mark differs from the first mark by its shape. The first mark overlaps a number of areas and the second mark overlaps a different number of areas. The items can therefore be identified by the marks. An evaluation device 3 for evaluating signals from the sensors is connected to the sensors through a multiplicity of signal lines 10. The result of the evaluation is that: the first item is situated at the first position and the second item is situated at the second position. The result is indicated on a display 15, in which case it is possible to see where which item is situated on the sensor device.

In the example shown in FIG. 5, the sensors 6.2a, 6.2b, etc. are each formed by two or more areas 6.3a, 6.3b, etc. In this case, the assignments of the areas to the sensors are not stipulated but rather result from the type of evaluation by the evaluation device 3. In one step of the evaluation, the area 6.3x may form a sensor together with the area 6.3y and, in another step of the evaluation, the area 6.3x may form a sensor together with the area 6.3z. The area 6.3x would be the transmitter, for example, and the two areas 6.3y and 6.3z would be respective receivers. The evaluation can check, in particular, gradually changing area pairs or area groups for the presence and identity of an item. With such evaluation, each area may be both a transmitting area and a receiving area. Provision may also be made to provide fixed or roaming transmitters and to surround the latter with a multiplicity of (concomitantly roaming) receivers.

Figure 6:
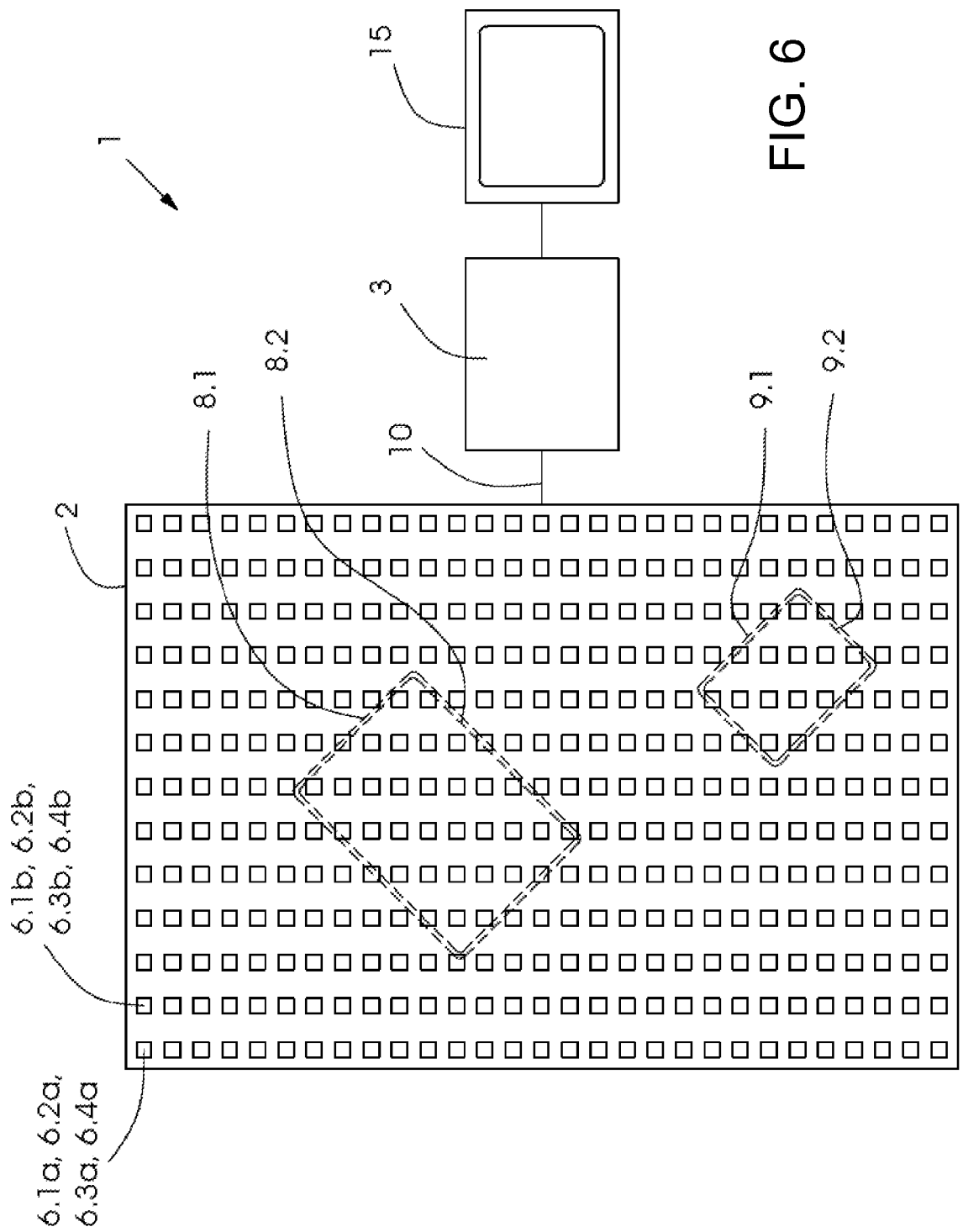
FIG. 6 is a plan view of another preferred exemplary embodiment of a system according to the invention.

FIG. 6 shows a further system according to the invention.

The sensor device 2 likewise includes a multiplicity of capacitive sensors 6.2a, 6.2b, etc. at different positions 6.1a, 6.1b, etc. (or a two-dimensional sensor array 6.2A). Each sensor includes a plurality of electrically conductive areas 6.3a, 6.3b, etc. and detects a measuring region 6.4a, 6.4b, etc. assigned to it. A first item 8.1 includes an electrically conductive first mark 8.2. An evaluation device 3 connected to the sensors through signal lines 10 scans the sensor array in the X-Y direction serially (row-by-row and column-by-column) and in the process detects sensor signals from the capacitive sensors, which signals are caused or changed by the respective electrically conductive marks of the items which can be positioned in a variable manner. The positions of the items are detected in this manner. The items are identified by the size of the mark or another property of the mark which affects the capacitance of the respective sensor (for example number, spacing, length, width, thickness, material, 1D, 2D or 3D structure). The result is displayed on a display 15. Alternatively, sensors which are disposed with an offset with respect to one another are also possible, for example sensors disposed in honeycomb form. The sensor grid of the sensor device may be produced so finely that lettering (preferably logos on packaging items) printed by using electrically conductive ink, for example, can be read. In this case, it would be possible to dispense with additional marks.

Figure 7:
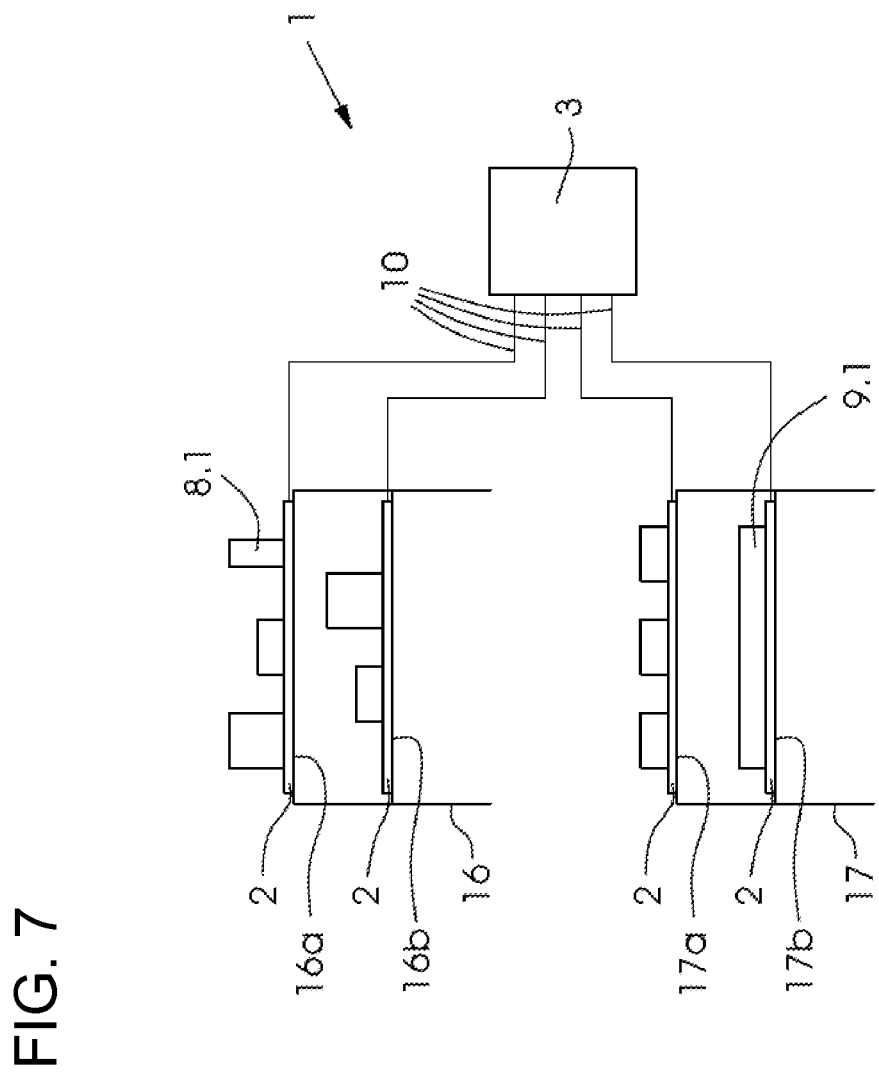
FIG. 7 is a plan view of a further preferred exemplary embodiment of a system according to the invention.

FIG. 7 shows a further system according to the invention.

The system 1 has a first shelf 16 for items 8.1, 9.1, etc., having at least two bottoms 16a and 16b disposed above one another, with each bottom being provided with a respective sensor device 2. The system 1 has a second shelf 17 for items 8.1, 9.1, etc., having at least two bottoms 17a and 17b disposed above one another, each bottom being provided with a respective sensor device 2. Further shelves and/or further bottoms may also be provided. The system preferably has a multiplicity of such shelves and the evaluation device 3 locates and identifies items on at least two bottoms of different shelves at substantially the same time. The sensor devices may also be directly integrated in the bottoms, for example made of non-conductive plastic or with a corresponding coating.

The items have substantially flat bottoms made of cardboard or paperboard (alternatively: film) and the marks are printed onto the bottoms or are produced through the use of film transfer. Possible printing methods are offset printing, flexographic printing, gravure printing, inkjet, toner printing and screen printing. This type of production is possible inline while printing the items and therefore saves time and costs. The items may preferably be packaging items. A sensor device matched to the respective packaging items and their marks can be stored until used in the outer packaging of the packaging items. Alternatively, the sensor device may be integrated in the outer packaging. The evaluation device would then only have to be coupled to the outer packaging. The system can therefore be used in warehousing or else in sales rooms as an intelligent shelving system which can determine, process and output information relating to the position and identity of the stored items at any time. It is also possible to check or monitor when a particular item is removed from the shelf. This function could be used in connection with theft protection or payment systems. Provision may also be made to count, move, remove or position items or to detect incorrect positions and warn of incorrect positioning on the basis of the information obtained. A further interesting use is the finding of incorrectly positioned books in libraries.

The coding of the items using the marks also makes it possible to identify the items only on particular shelves as "correct" and to control functions in dependence on the item directly on the shelf or in the vicinity thereof, for example advertisements, lighting effects, raffles or product information.

In the case of hanging items, the marks may be applied to the hangers and the sensors may be fitted to the hanging rails. In the case of stacked items, the marks may be applied to the sides of the items and the sensors may be fitted to the sides of the shelves. The items may also be accommodated in depressions in the sensor device, with the depressions being fitted with sensors on their bottom and/or on their sides.

The invention claimed is:

1. A system for locating and identifying at least two separate items, the system comprising:
   a sensor device having a first position with a first measuring region and a second position with a second measuring region, said second position differing from said first position;
   at least one capacitive first sensor configured to detect said first measuring region at said first position of said sensor device, said at least one capacitive first sensor being at least one electrically conductive area including printable, electrically conductive material;
   at least one capacitive second sensor configured to detect said second measuring region at said second position of said sensor device, said at least one capacitive second sensor being at least one electrically conductive area including printable, electrically conductive material;
   at least one electrically conductive first mark of a first item disposed in said measuring region of one of said sensors, said at least one electrically conductive first mark being at least one electrically conductive area including printable, electrically conductive material;
   at least one electrically conductive second mark of a second item disposed in said measuring region of another of said sensors, said at least one electrically conductive second mark being at least one electrically conductive area including printable, electrically conductive material; and
   an evaluation device configured to evaluate signals from said sensors, the signals being caused or changed by electrical conductivity of said marks of the items.

2. The system according to claim 1, wherein said sensor device includes a two-dimensional configuration of sensors.

3. The system according to claim 1, wherein said items have substantially flat bottoms made of cardboard or paperboard, and said marks are printed onto said bottoms or produced by film transfer.

4. The system according to claim 1, wherein said sensor device has an electrically non-conductive film, and said areas are printed onto said film or produced by film transfer.

5. The system according to claim 1, which further comprises a shelf for the items, said shelf having at least two bottoms disposed above one another, and each bottom being provided with a respective sensor device.

6. The system according to claim 5, wherein said shelf is one of a multiplicity of shelves, and said evaluation device locates and identifies items on at least two bottoms of different shelves at substantially the same time.

* * * * *